(12) United States Patent
Stallings et al.

(10) Patent No.: US 9,448,715 B2
(45) Date of Patent: Sep. 20, 2016

(54) GROUPING OF RELATED GRAPHICAL INTERFACE PANELS FOR INTERACTION WITH A COMPUTING DEVICE

(75) Inventors: Heath Stallings, Colleyville, TX (US); Sok Y. Hwang, Dallas, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1066 days.

(21) Appl. No.: 12/651,684

(22) Filed: Jan. 4, 2010

(65) Prior Publication Data

US 2011/0167387 A1 Jul. 7, 2011

(51) Int. Cl.
*G06F 3/0488* (2013.01)
*G06F 3/0481* (2013.01)

(52) U.S. Cl.
CPC ....... *G06F 3/04883* (2013.01); *G06F 3/04817* (2013.01)

(58) Field of Classification Search
CPC ............. G06F 3/0482; G06F 3/04842; G06F 3/0488; G06F 17/30412; G06F 3/0416
USPC ................. 715/826, 810, 764, 864
See application file for complete search history.

(56) References Cited

U.S. PATENT DOCUMENTS 7,246,329 B1 * 7/2007 Miura et al. ............ 715/810
8,436,715 B2 * 5/2013 Elgort et al. ........... 340/10.1

FOREIGN PATENT DOCUMENTS

EP    1837746 A2 *  9/2007

OTHER PUBLICATIONS

Co-pending U.S. Appl. No. 12/341,500 entitled "Stage Interaction for Mobile Device" by Heath Stallings et al., filed Dec. 22, 2008, 40 pages.

* cited by examiner

*Primary Examiner* — Jeffrey A Gaffin
*Assistant Examiner* — Sabrina Greene

(57) ABSTRACT

A stage-based user interface for a mobile device may include a sequence of panels that each include a cluster or grouping of items, such as graphical links, application shortcuts, representations of documents, or representations of other data associated with the mobile device. The panels in the sequence of panels may be grouped so that panels that are related or that include similar items may be placed next to one another in the sequence of panels. In one implementation, the device may particularly display a graphical window that presents a panel selected from a sequence of panels, the panels in the sequence of panels each associated with a group of items and the sequence of panels having an order determined at least partially by the groups of items associated with the panels.

22 Claims, 15 Drawing Sheets

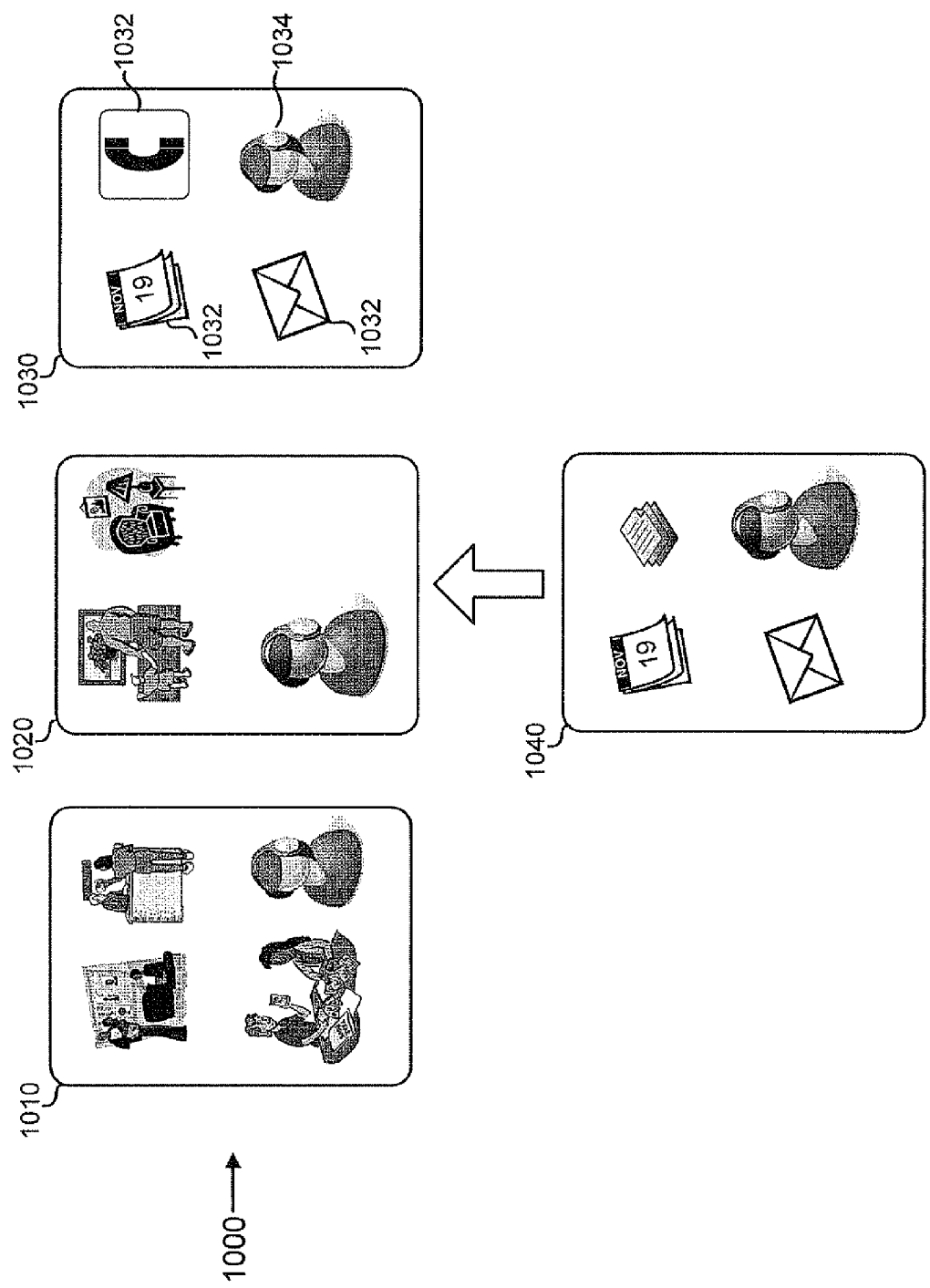

GROUPING OF RELATED GRAPHICAL INTERFACE PANELS FOR INTERACTION WITH A COMPUTING DEVICE

BACKGROUND

Electronic devices continue to increase in complexity and functionality. This poses several challenges to designers of such devices. For example, it may be difficult to develop and provide an intuitive, functional, and convenient user interface for an electronic device, especially when the device is small in size.

Recently, touch-screen displays have become popular user interfaces for certain electronic devices, such as mobile devices. Touch-screens are especially conducive to mobile devices at least because they allow for an expansive set of user inputs and can replace other limited input interfaces such as dedicated mechanical input buttons. However, there remains room to improve upon standard touch screen interfaces.

A mobile device may provide a number of applications to the user, including telephony applications, organizers, email applications, instant messaging (IM) applications, games, cameras, image viewers, etc. These applications may be launched when a user selects an icon on the touch-screen display to activate the application. The available touch-screen display sizes of many mobile devices may limit the number of icons that can be effectively presented. Existing user interfaces may provide one of a variety of menu formats that group menu items into categories and sub-categories. These user interfaces may require a user to "drill down" through multiple menus to select a desired icon or other item.

BRIEF DESCRIPTION OF THE DRAWINGS

FIGS. 10A and 10B are diagrams illustrating insertion of a new panel into an existing sequence of panels;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide a stage-based user interface for a mobile device (e.g., a cell phone, a personal digital assistant (PDA), a personal computer, a laptop computer, a remote control, etc.) or another type of computing device. A stage may be defined as environment that includes a number of panels that each include a cluster or grouping of items, such as graphical links, application shortcuts, representations of documents, or representations of other data associated with the mobile device. The items of a panel may be presented to users as graphical icons. The stage-based user interface may include a sequence of panels that can be selected and easily navigated by the user. The panels in the sequence of panels may be grouped so that panels that are related or that include similar items may be placed next to one another in the sequence of panels.

Figure 1:
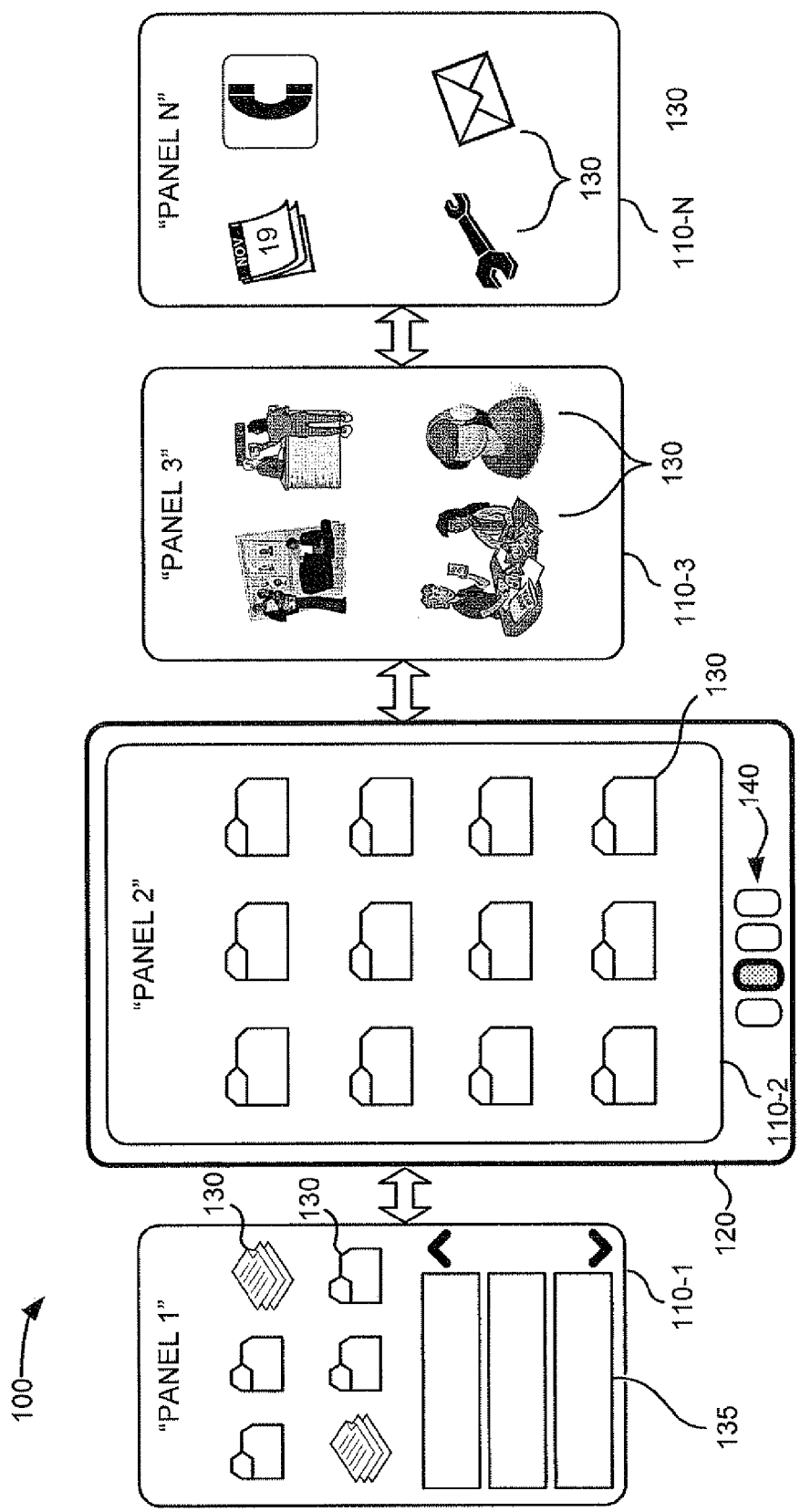
FIG. 1 is a diagram illustrating an exemplary implementation of a stage-based user interface.

FIG. 1 is a diagram illustrating an exemplary implementation of a stage-based user interface 100. Stage-based user interface 100 may include separate panels (graphical windows) 110-1, 110-2, 110-3 . . . 110-N (referred to herein collectively as panels 110 and singularly as panel 110) that can be presented to the user by sliding each panel onto a display 120. Display 120 may include, for example, all or a portion of a display of a mobile device.

Each panel 110 of stage-based user interface 100 may, when displayed on display 120, present items 130. Each item may be a graphical representation of, for example, links, application shortcuts, pictures, representations of documents, or representations of other data. For example, one panel 110 may include a group of application shortcuts, while another panel 110 may include icons representing documents, while another panel 110 may include images (or image thumbnails) and application shortcuts. Additionally, some items 130 may be presented within panel 110 as a vertical stack that a user may scroll through vertically to display additional items. User input, such as a horizontal touch gesture on a touch-sensitive screen, may be applied to slide a new panel 110 onto display 120. In one implementation, user input for items displayed within a panel 110 may be limited to item selections and/or vertical touch gestures. In some implementations, stage-based user interface 100 may include a dynamic footer 140 to indicate a relative position of a displayed panel (e.g., panel 110-2) among the other panels (e.g., panels 110-1, 110-N). Thus, systems and/or methods described herein may provide a user interface that can be implemented with few gestures/keystrokes and can minimize the need to "drill down" through multiple menus.

Consistent with aspects described herein, panels 110 may be arranged such that similar or like panels 110 are grouped together. For example, panels 110 may be represented in footer 140 so that similar panels (i.e., panels with similar items) are next to one another. In this manner, a user that performs a horizontal touch gesture on a touch-sensitive screen may slide a new, but similar panel, onto display 120.

Although FIG. 1 shows an exemplary stage-based user interface 100, in other implementations, stage-based user interface 100 may be arranged differently than depicted in FIG. 1. For example, panels 110 may include a different number and/or arrangement of items 130. Also, stage-based user interface 100 may include a different number and/or arrangement of panels 110 on display 120 and/or different arrangement of footer 140 within display 120.

Figure 2:
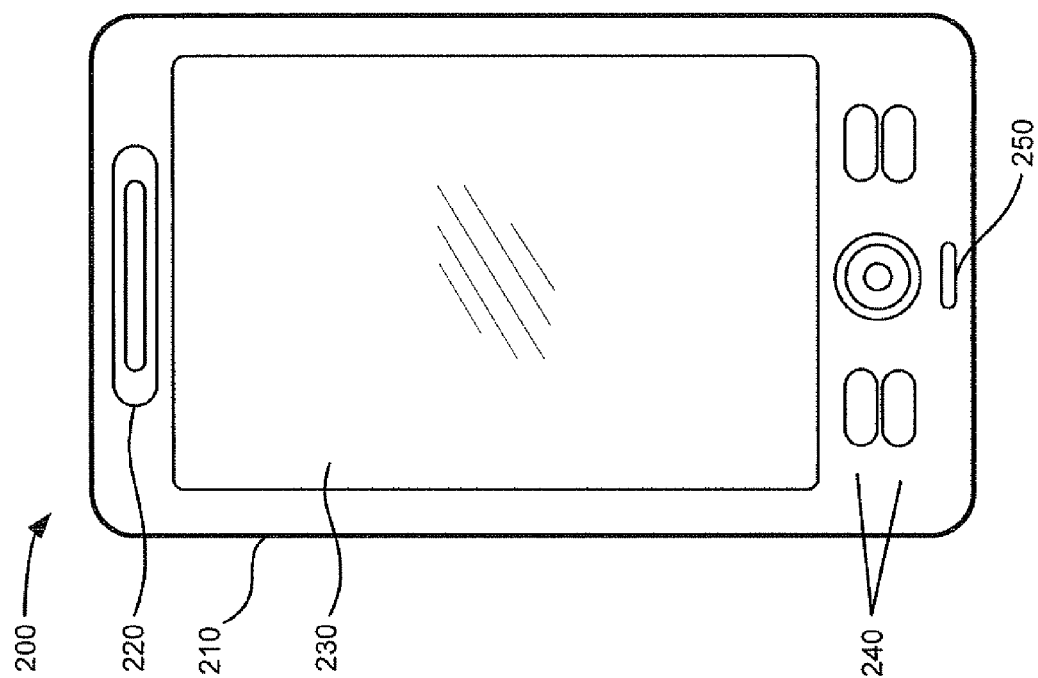
FIG. 2 depicts a diagram of an exemplary device in which systems and/or methods described herein may be implemented.

FIG. 2 is a diagram of an exemplary device 200 in which systems and/or methods described herein may be implemented. Device 200 may include a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a remote control (e.g., for a television), a portable gaming system, a global positioning system (GPS) device, a printer, a facsimile machine, a pager, a camera (e.g., a contemporary camera or a digital camera), a video camera (e.g., a camcorder), a personal computer, a laptop computer, any other device capable of receiving user input to a display, etc.

As illustrated in FIG. 2, device 200 may include a housing 210, a speaker 220, a display 230, control buttons 240, and/or a microphone 250. Housing 210 may protect the components of device 200 from outside elements. Housing 210 may include a structure configured to hold devices and components used in device 200, and may be formed from a variety of materials. For example, housing 210 may be formed from plastic, metal, or a composite, and may be configured to support speaker 220, display 230, control buttons 240 and/or microphone 250.

Speaker 220 may provide audible information to a user of device 200. Speaker 220 may be located in an upper portion of device 200, and may function as an ear piece when a user is engaged in a communication session using device 200. Speaker 220 may also function as an output device for music and/or audio information associated with games and/or video images played on device 200.

Display 230 may provide visual information to the user. For example, display 230 may display text input into device 100, text, images, video, and/or graphics received from another device, and/or information regarding incoming or outgoing calls or text messages, emails, media, games, phone books, address books, the current time, etc. For example, display 230 may include a liquid crystal display (LCD), such as a thin film transistor (TFT) LCD, etc.

In one implementation, display 230 may include a touch screen display that may be configured to receive user input when a user touches (or comes in close proximity to) display 230. For example, the user may provide an input to display 230 directly, such as via the user's finger, or via other devices, such as a stylus. User inputs received via display 230 may be processed by components and/or devices operating in device 200. The touch-screen-enabled display 230 may permit the user to interact with device 200 in order to cause device 200 to perform one or more operations. Exemplary technologies to implement a touch screen on display 230 may include, for example, a near-field-sensitive (e.g., capacitive) overlay, an acoustically-sensitive (e.g., surface acoustic wave) overlay, a photo-sensitive (e.g., infrared) overlay, a pressure sensitive (e.g., resistive) overlay, and/or any other type of touch panel overlay that allows display 230 to be used as an input device. The touch-screen-enabled display 230 may also identify movement of a body part or a pointing device as it moves on or near the surface of the touch-screen-enabled display 230.

Control buttons 240 may permit the user to interact with device 200 to cause device 200 to perform one or more operations. For example, control buttons 240 may be used to cause device 200 to transmit information. Microphone 250 may receive audible information from the user. For example, microphone 250 may receive audio signals from the user and may output electrical signals corresponding to the received audio signals.

Although FIG. 2 shows exemplary components of device 200, in other implementations, device 200 may contain fewer, different, differently arranged, or additional components than depicted in FIG. 2. For example, in some implementations device 200 may include a keypad, such as a standard telephone keypad, a QWERTY-like keypad (e.g., a traditional configuration of typewriter or computer keyboard keys), or another keypad layout. In still other implementations, a component of device 200 may perform one or more tasks described as being performed by another component of user device 200.

Figure 3:
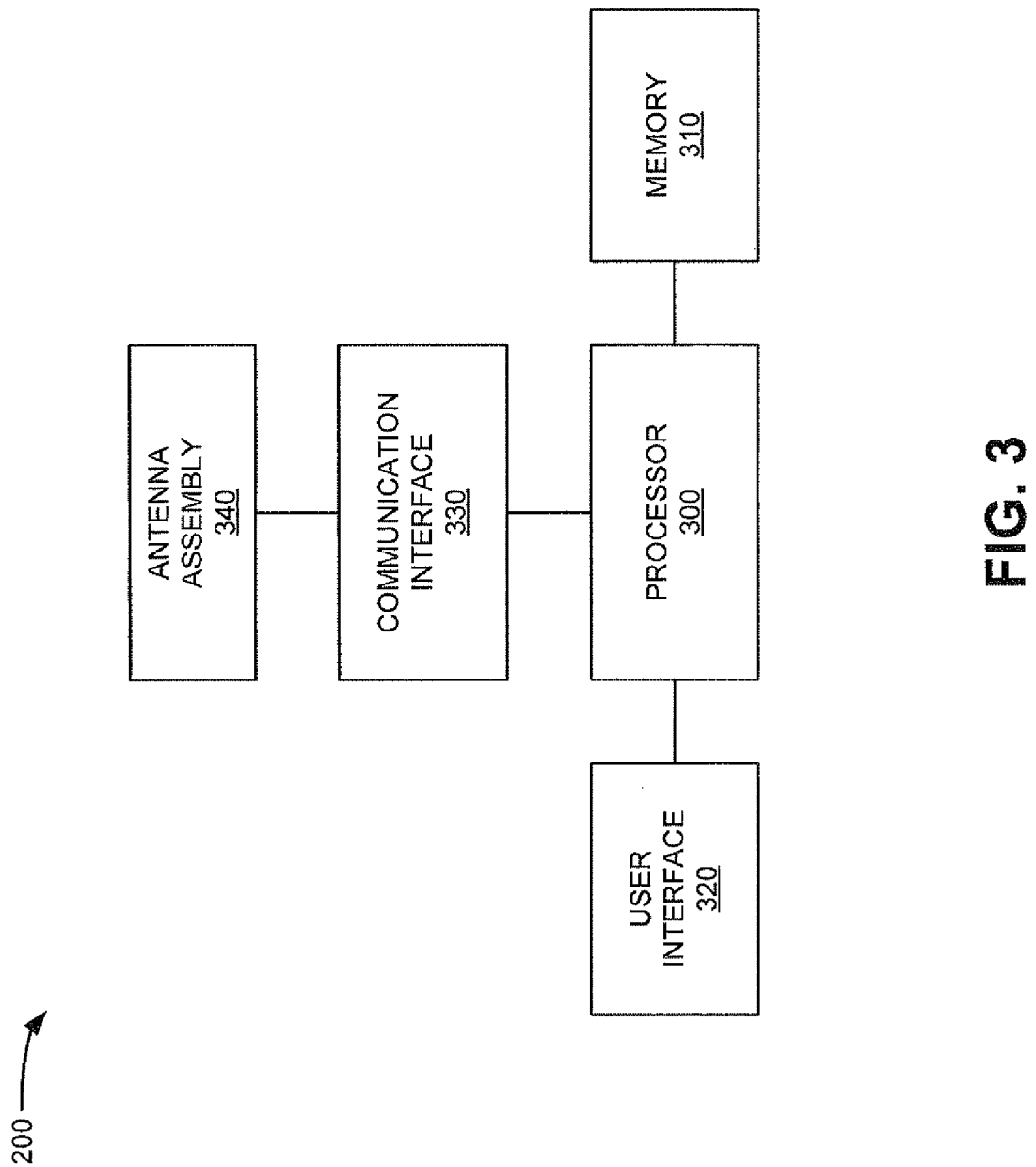
FIG. 3 depicts a diagram of exemplary components of the device illustrated in FIG. 2.

FIG. 3 is a diagram of exemplary components of device 200. As illustrated, device 200 may include a processor 300, a memory 310, a user interface 320, a communication interface 330, and/or an antenna assembly 340.

Processor 300 may include one or more microprocessors, application specific integrated circuits (ASICs), field programmable gate arrays (FPGAs), or the like. Processor 300 may control operation of device 200 and its components. In one implementation, processor 300 may control operation of components of device 200 in a manner described herein.

Memory 310 may include a random access memory (RAM), a read-only memory (ROM), and/or another type of memory to store data and instructions that may be used by processor 300. In one implementation, memory 310 may store data used to display a graphical user interface, such as stage-based user interface 100 on display 230.

User interface 320 may include mechanisms for inputting information to device 200 and/or for outputting information from device 200. Examples of input and output mechanisms might include buttons (e.g., control buttons 240, keys of a keypad, a joystick, etc.); a speaker (e.g., speaker 220) to receive electrical signals and output audio signals; a microphone (e.g., microphone 250) to receive audio signals and output electrical signals; a display (e.g., display 230) to receive touch input and/or to output visual information (e.g., time-related items received by device 200); a vibrator to cause device 200 to vibrate; and/or a camera to receive video and/or images.

Communication interface 330 may include, for example, a transmitter that may convert baseband signals from processor 300 to radio frequency (RF) signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive RF signals over the air. Antenna assembly 340 may, for example, receive RF signals from communication interface 330 and transmit them over the air, and receive RF signals over the air and provide them to communication interface 330. In one implementation, for example, communication interface 330 may communicate with a network and/or devices connected to a network.

As will be described in detail below, device 200 may perform certain operations described herein in response to processor 300 executing software instructions of an application contained in a computer-readable medium, such as memory 310. A computer-readable medium may be defined as a physical or logical memory device. A logical memory device may include a space within a single physical memory device or spread across multiple physical memory devices. The software instructions may be read into memory 310 from another computer-readable medium or from another device via communication interface 330. The software instructions contained in memory 310 may cause processor 300 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 200, in other implementations, device 200 may contain fewer, different, differently arranged, or additional components than depicted in FIG. 3. In still other implementations, a component of device 200 may perform one or more other tasks described as being performed by another component of device 200.

Figure 4:
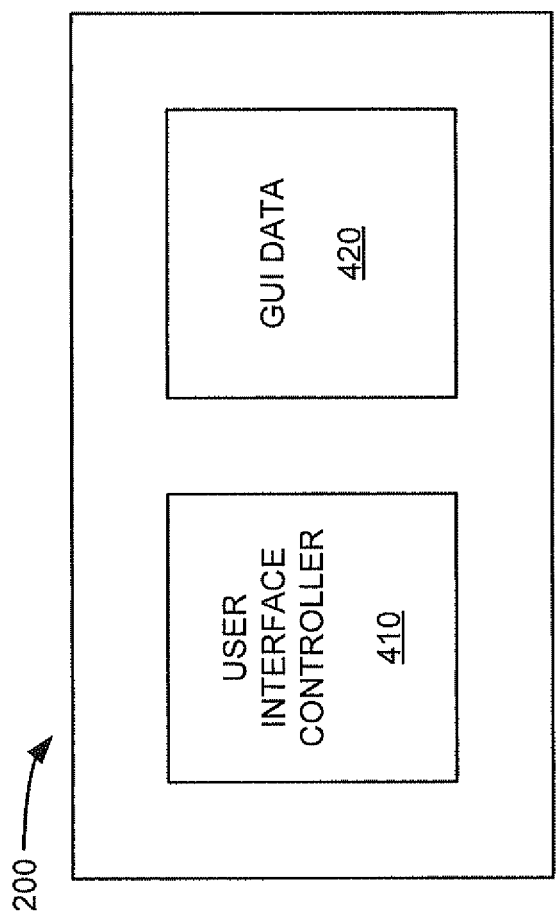
FIG. 4 is a diagram of exemplary functional components of the device illustrated in FIG. 2.

FIG. 4 provides a diagram of exemplary functional components of device 200. As shown in FIG. 4, device 200 may include a user interface controller 410 and graphical user interface (GUI) data 420. In one implementation, the functions described in connection with FIG. 4 may be performed by one or more of the components depicted in FIG. 3. Device 200 may also include other peripheral applications (not shown) that provide communication to and other services for device 200. Peripheral applications may include, for example, a telephone application, a text-messaging application, an email application, an instant messaging (IM) application, a calendar application, a multimedia messaging service (MMS) application, a short message service (SMS) application, an image viewing application, a camera application, an organizer, a video player, an audio application, a GPS application, etc.

User interface controller 410 may generate and update a graphical user interface for a sliding window menu arrangement (e.g., stage-based user interface 100). In one implementation, user interface controller 410 may assemble items 130 based on one or more templates. Templates may include for example, arrangements for groups of display items 130 associated with each of panels 110 of stage-based user interface 100. For example, user interface controller 410 may retrieve, from GUI data 420, an item 130 representing a peripheral application, may apply stored user preferences, and may insert items 130 into a graphic template. User interface controller 410 may also receive items 130 from peripheral applications within device 200. In one implementation, items 130 may include links to applications and/or files (e.g., particular objects that can be presented on one of the applications). In other implementations, items 130 may include a combination of links along with other information relating to particular applications.

User interface controller 410 may receive input to identify what items 130 may be assigned to a particular panel 110. User interface controller 410 may store panel assignments, for example, in GUI data 420. User interface controller 410 may also include logic to present footer 140 in an activated or deactivated mode. User interface controller 410 may also store trigger information to detect, for example, when footer 140 may be activated/deactivated. In one implementation, when footer 140 is in an activated mode, user interface controller 410 may track user input to footer 140 and display a panel 110 corresponding to a currently selected portion o footer 140.

GUI data 420 may include information that may be used by user interface controller 410 to generate panels 110. In one implementation, GUI data 420 may be included within memory 310. GUI data 420 may include, for example, user preferences, images, and triggers related to stage-based user interface 100. Exemplary user preferences may include format preferences for particular panels 110 (e.g., font/icon sizes, colors, window titles, backgrounds, etc.), transition animations for switching between panels 110 (e.g., slide in/out, wipe orientations, scattering, etc.), sequencing of panels 110, footer 140 icons associated with each panel, and panel 110 assignments for display items 130. In some implementations, panel 110 assignments for items 130 (e.g., the particular items 130 associated with each panel 110) may be user-configurable. In other implementations, items 130 may include a combination of default items 130 and user-selected items 130.

Images may include images associated with items 130 (e.g., icons for applications and/or files), background images for panels 110, etc. Triggers related to stage-based user interface 100 may include, for example, particular user input to display 230 that may cause a change to a panel 110.

Although FIG. 4 shows exemplary functional components of device 200, in other implementations, device 200 may contain fewer, different, differently arranged, or additional functional components than depicted in FIG. 4. In still other implementations, a functional component of device 200 may perform one or more tasks described as being performed by another functional component of device 200.

Figure 5:
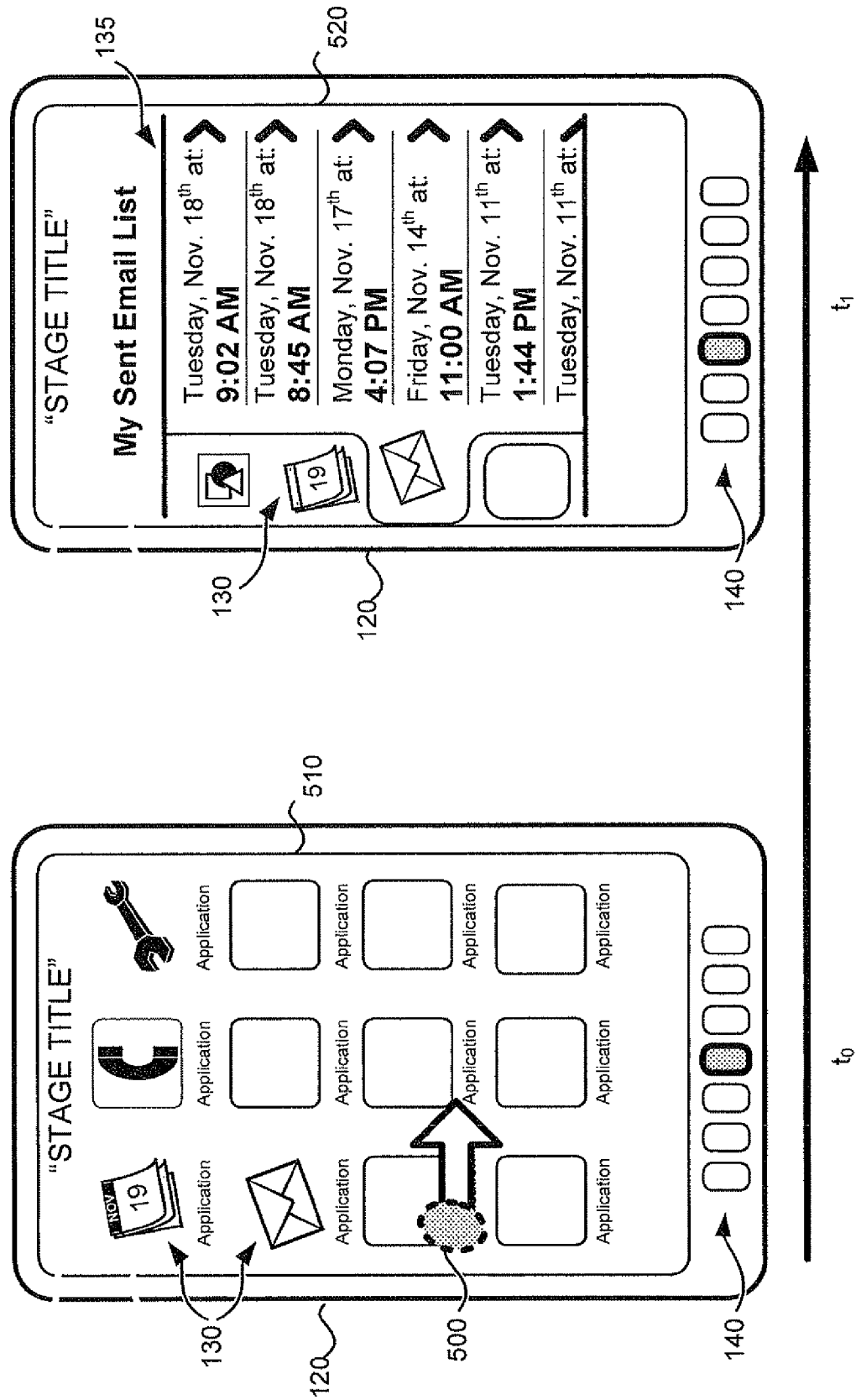
FIG. 5 is a diagram illustrating exemplary sliding stage operations capable of being performed by a device, such as the device shown in FIG. 2.

FIG. 5 illustrates exemplary sliding stage operations capable of being performed by a device, such as device 200. In FIG. 5, stage-based user interface 100 is shown as a function of time progressing from time $t_0$ to time $t_1$. At time $t_0$, a panel 510 may be displayed on display 120. Panel 510 may include a group of display items 130 previously assigned to panel 510. Display items 130 shown in panel 510 may be selected by a user to, for example, launch an application associated with an item 130. Also, footer 140 may be shown at the bottom of display 120. Footer 140 may include an indication of where panel 510 lies in a sequence of available panels 110. As shown in FIG. 5, at time $t_0$, panel 510 may be shown as the fourth in a sequence of seven panels 110. At time $t_0$, a user may apply a touch 500 to touch-sensitive display 120 in the area of panel 510. Touch 500 may slide in the direction indicated on FIG. 5, which device 200 may interpret as a horizontal gesture to change the viewable stage. Panel 510 may appear to scroll to the user's right.

At time $t_1$, another panel 520 may be presented to the user. As shown by footer 140, panel 520 may be the next panel (to the user's apparent left of panel 510) in the sequence of available panels 110 of stage-based user interface 100. Depending on the horizontal gesture interpreted by device 200 (e.g., the speed and/or length of the slide of touch 500), device 200 may scroll to the next panel in the sequence of panels 110 or device 200 may scroll past multiple panels 110. Panel 520 may include a group of items 130 (e.g., a list of items related to a particular display item). Panel 520 may include display items 130 and a list of information associated with an email application. A user may select one of items 130 (e.g., using a "tap" touch gesture), scroll down a list of information (e.g., using a vertical touch gesture), or switch to another panel (e.g., using a horizontal touch gesture). Thus, a user can manipulate stage-based user interface 100 using just three basic gestures. In other implementations described below, other types of user input may be used to manipulate stage-based user interface 100.

Figure 6:
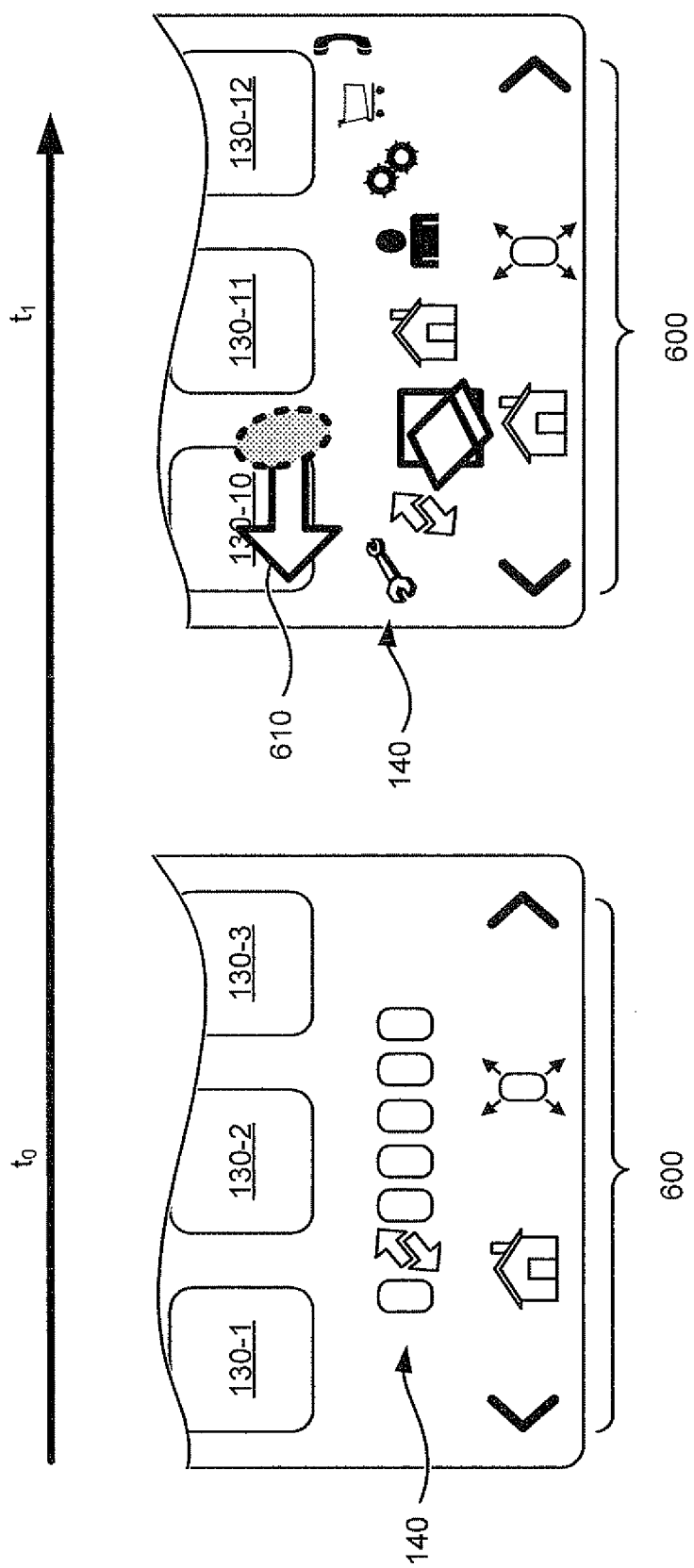
FIG. 6 provides examples of a footer arrangement for a stage-based user interface according to implementations described herein.

FIG. 6 provides an example of a stage-based user interface 100 according to implementations described herein. More particularly, FIG. 6 provides partial views of a panel 110 as a function of time progressing from time $t_0$ to time $t_1$. At time $t_0$, panel 110 is shown with footer 140 in an inactive state. In the implementation of FIG. 6, inactive footer 140 may indicate where the currently displayed panel lies in the sequence of available panels 110. For the currently displayed window, footer 140 may show an icon or symbol that may correspond to the types of items 130 and/or information included in the current panel. The relative position of other panels within footer 140 may be indicated, for example, by small blank windows (as shown), dots, or other generic place indicators. Panel 10 may optionally include a set of command icons 600, which may be used to direct the display of panel 110. Command icons 600 may include, for example, left/right icons to change between windows, a home window button to jump directly to a designated main/home panel, a magnification button to zoom in/out of a panel, and/or a full-screen icon to toggle between a full-panel presentation and a smaller presentation.

At time $t_1$ of FIG. 6, a user may provide a horizontal gesture in the form of a sliding touch 610. Touch 610 may activate footer 140, causing device 200 to generate a dynamic view of footer 140. The dynamic view of footer 140 may display icons/symbols corresponding to each available panel in panel-based user interface 100. As the user causes the windows to slide into and out of panel 110, footer 140 may indicate the currently displayed panel to the user and the relative location of the other available panels. The icon of footer 140 corresponding to the currently displayed panel 110 may be indicated, for example, by color, position, relative size, etc.

Figure 7:
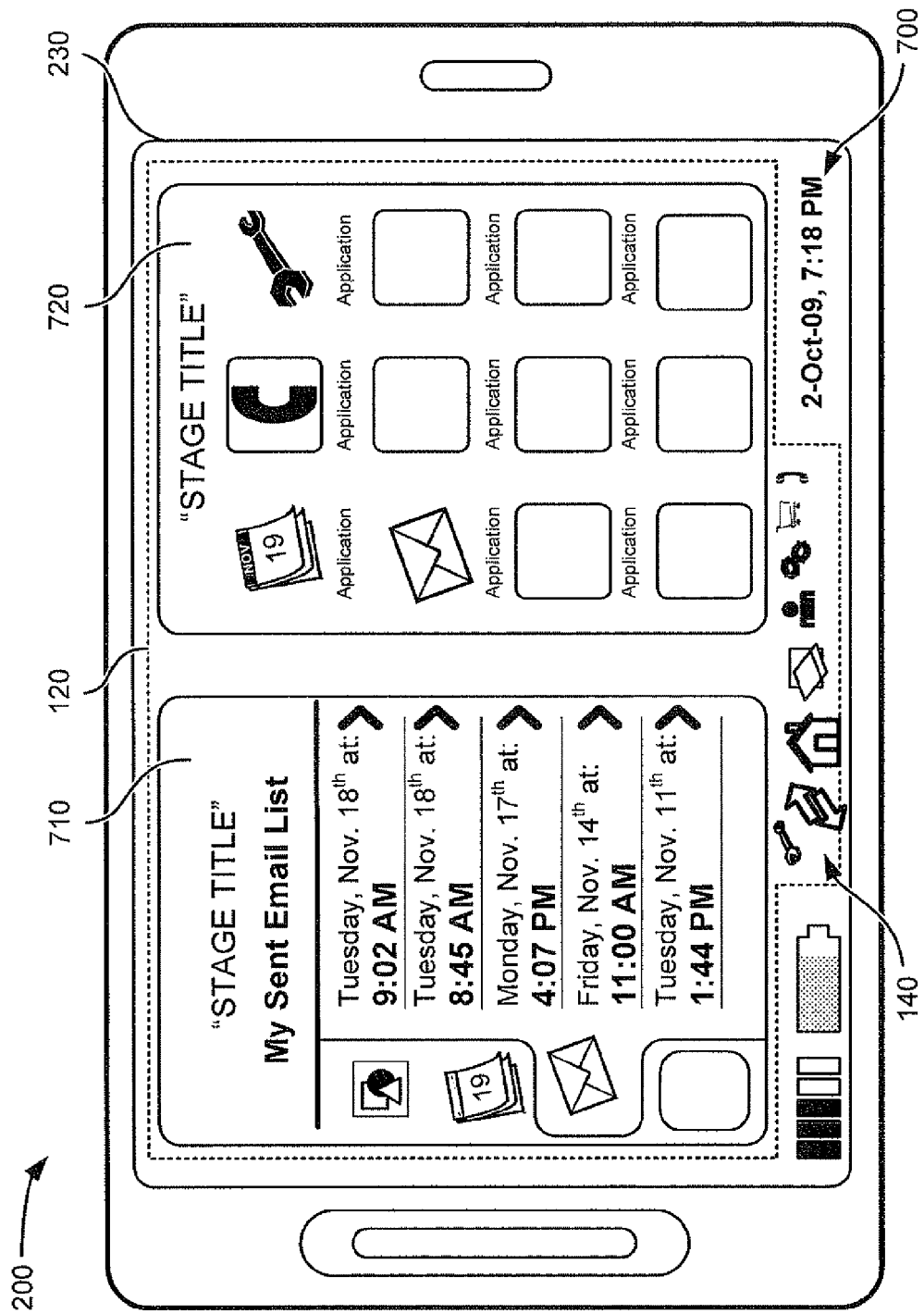
FIG. 7 provides an example of the stage-based user interface according to another implementation.

FIG. 7 provides an example of a stage-based user interface according to another implementation. A shown in FIG. 7, device 200 may include display 230. Display 230 may present a first panel 710 and a second panel 720 of a stage, as well as footer 140. Footer 140 may display icons/symbols corresponding to each available panel in stage-based user interface 100. Footer 140 may indicate the currently displayed panel to the user relative to the sequence of the other available panel. Panels 710 and 720 may not encompass the entire viewable area of display 230, leaving room for other information 700 that may not be affected by user input to stage-based user interface 100.

Although FIG. 7 shows an exemplary stage-based user interface including two panels 120, in other implementations, device 200 may contain fewer, different, or additional panel arrangements than depicted in FIG. 7. For example, in one implementation, device 200 may display more than two panels. In another exemplary implementation, two or more panels may be displayed with a partial overlapping of the panels. In still another implementation, panels 710 and 720 may be displayed simultaneously on separate screens of the same device (e.g., a device with screens on both sides of an open clamshell-type housing). In such an implementation, footer 140 may span both screens or be duplicated on each of the screens.

Figure 8:
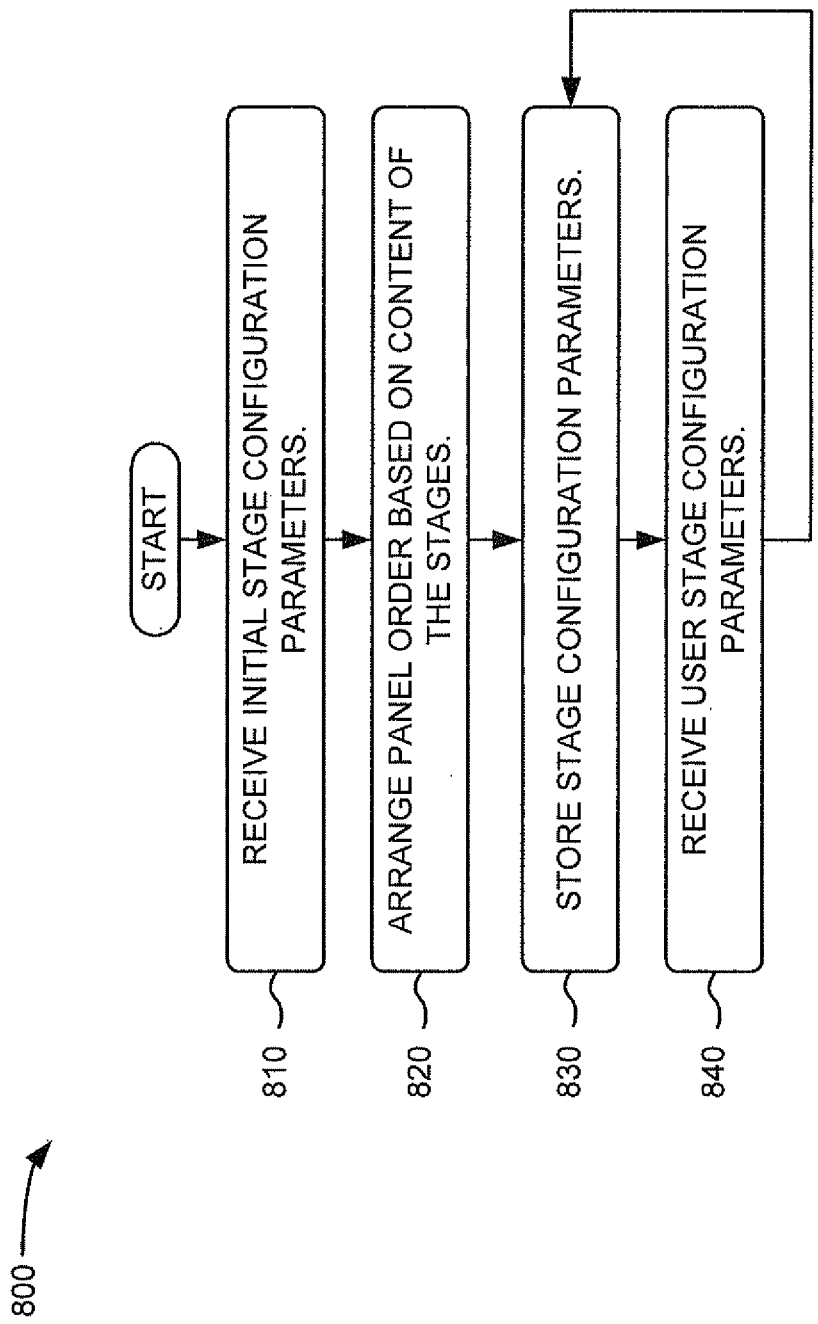
FIG. 8 depicts a flow chart of an exemplary process for configuring a panel of the stage-based user interface according to implementations described herein.

FIG. 8 depicts a flow chart of an exemplary process 800 for configuring a panel of a stage-based user interface according to implementations described herein. In one implementation, process 800 may be performed by device 200. The process may begin by receiving initial stage configuration parameters (block 810). For example, device 200 (e.g., user interface controller 410) may receive stage configuration parameters from, for example, an original equipment manufacturer (OEM) or software provider. Initial window configuration parameters may include, for example, templates for particular panels, sequencing of panels, user input triggers (e.g., touch gestures, control buttons, keypad input, etc.), icons/images, transition animations, links to particular content, links to particular applications, and/or links to particular memory locations (e.g., a "my pictures" folder, a documents folder, etc.). The initial stage configuration parameters may also include sequencing or ordering information for the panels. The ordering information may include information used to order the panels based on the content of the panels.

It may be particularly desirable to order the panels so that similar panels are grouped or are placed next to one another in the logical sequence order, such as that defined by footer 140. In this manner, a user navigating through the panels, such as by using a series of horizontal gestures to view different panels, may easily access similar panels to the panel currently being viewed. This may be advantageous because a user performing a task may be particularly likely to use a number of similar panels to perform the task.

The panel sequence order may be initially determined based on the content of the panels (i.e., the items of the panel) (block 820). In general, panels that include similar content may be arranged next to or near one another. The particular technique to use in determining how similar the content of one panel is to the content of another panel may be, for example, determined based on the initial stage configuration parameters or set at design or manufacture of device 200. One example of determining the similarity of panels may include ordering the panels based on a type of the items in the panels. For example, multiple panels that each contain a majority of items that represent links to word processing documents may be determined to be similar, while other panels that include links to multi-media files may be determined to be similar. Additional examples of techniques for determining the similarity of panel content will be discussed in more detail below.

The stage configuration parameters may be stored (block 830). The initial stage configuration parameters may be stored, for example, in memory 310 of device 200.

User stage configuration parameters may be received (block 840). For example, device 200 may receive user input to supplement (e.g., personalize) the initial stage configuration parameters. The user stage configuration parameters may include, for example, user preferences relating to additional or fewer elements in various panels, additional or fewer panels, and a different sequencing of panels 110 or the arrangement of items 130 in a panel. In particular, the user panel configuration parameters may include parameters that define how similarity between content (i.e., item) of one panel and content in another panel is to be measured. For example, the user may desire that the similarity between panels be measured based on the type of the items (e.g., word processing documents, multi-media documents, application shortcuts, etc.) in each panel, number of elements in each panel, or creation date of the elements in a panel.

The user stage configuration parameters may be provided, for example, via user interface 320. Additionally, the user stage configuration parameters may be downloaded from another source (e.g., via communication interface 330 of device 200). User stage configuration parameters may continue to be added and updated throughout the lifecycle of stage-based user interface 100. The user stage configuration parameters may be stored, for example, in memory 310 of device 200.

Figure 9:
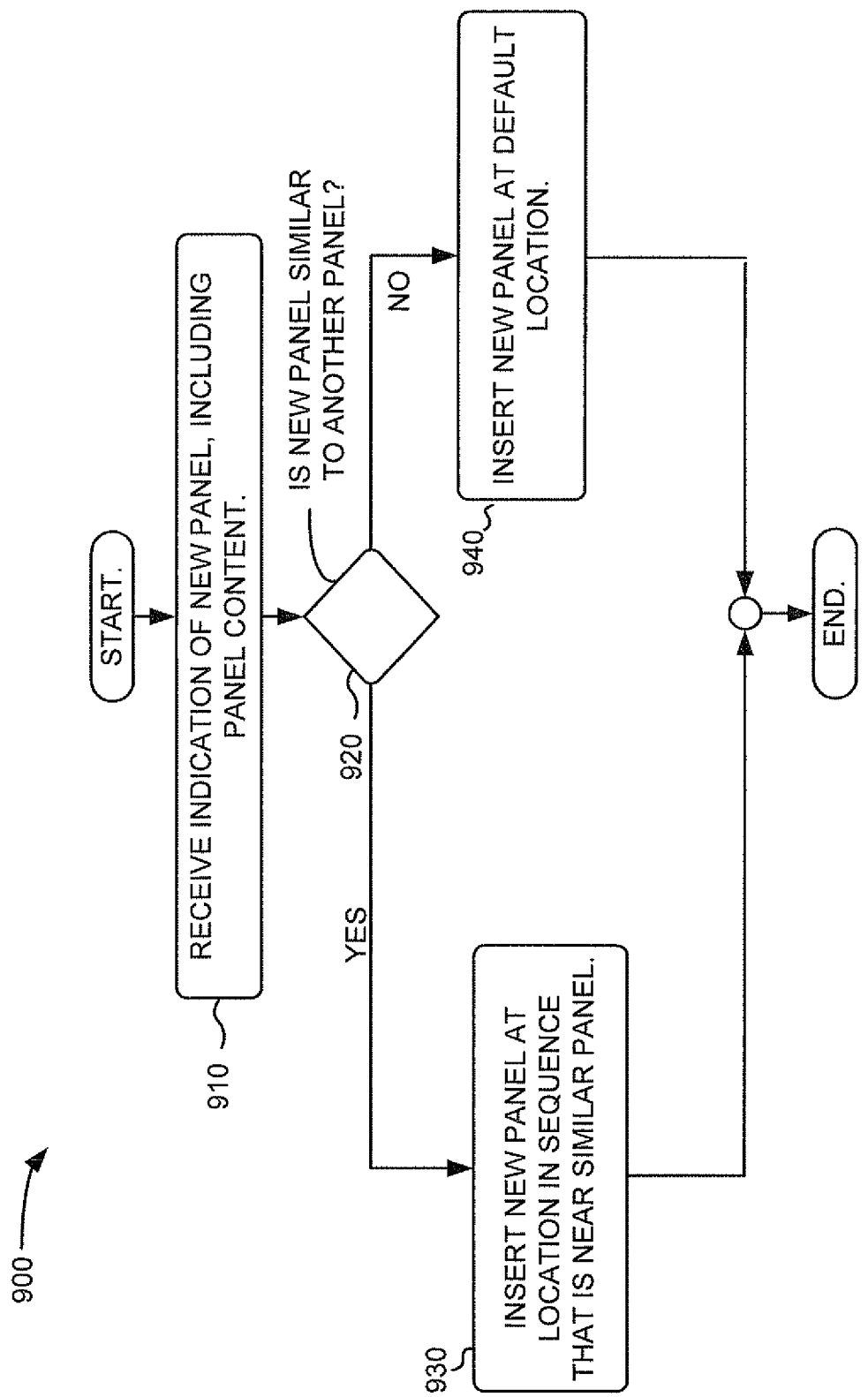
FIG. 9 is a flow chart illustrating an exemplary process for inserting a new panel in an existing sequence of panels.

FIG. 9 is a flow chart illustrating an exemplary process 900 for inserting a new panel in an existing sequence of panels. In one implementation, process 900 may be performed by device 200. A user may desire to add a new panel to current panels 110. Device 200 may receive an indication, such as a command input through stage-based user interface 100, from the user, that a new panel is to be added (block 910). The indication may include the content that is to be included in the panel (block 910). For example, the user may specify which items are to be included in the new panel.

The new panel may be compared to existing panels 110 to determine if the new panel is similar to another panel in panels 110 (block 920). If the new panel is similar to another panel in panels 110 (block 920—YES), the new panel may be inserted near the similar panel in the panel sequence (block 930). For example, the new panel may be inserted before or after the similar panel. In cases where multiple panels are determined to be similar to the new panel, the new panel may be inserted near the most similar panel. In one possible implementation, device 200 may confirm the location of the new panel with the user. For instance, device 200 may suggest a location for the new panel in the panel sequence and the user may confirm or adjust the location.

As previously mentioned, a number of techniques may be used to compare panels to determine similarity between panels. One such technique may be based on a comparison of the types of items in different panels. Items 130 in a panel 110 may include, for example, application shortcuts, representations of documents (e.g., a graphical icon or other link that represents a document), representations of multimedia files such as music or video files, or representations of other information. In some implementations, items 130 may include a graphical representation that is dynamically updated, such as a clock "widget" that is displayed in a stage 110. A similarity value for two panels may be determined based on the number of matching item types in the two panels. For example, a panel that includes a set of application icons and a set of shortcuts to music files may have a high similarity to another panel that includes application icons and shortcuts to music files, even if the applications and music files are not identical. In another possible implementation, panels 110 may be compared for similarity based on the number or portion of identical overlapping items 130 in the panels. For example, two panels may have a high similarity value if the panels have a number of identical items, such as links to the same documents or files.

As an example of another technique that may be used for determining the similarity between panels, the number of items 130 in two panels may be compared. Panels with an equal number of items may thus be determined to be similar. As another example of another technique that may be used for determining the similarity between panels, the author or creator of the panels may be compared. For example, panels inserted by the user may be determined to be similar to other panels inserted by the user and not as similar to default v that were programmed into device 200 during manufacture of device 200.

Figure 10B:
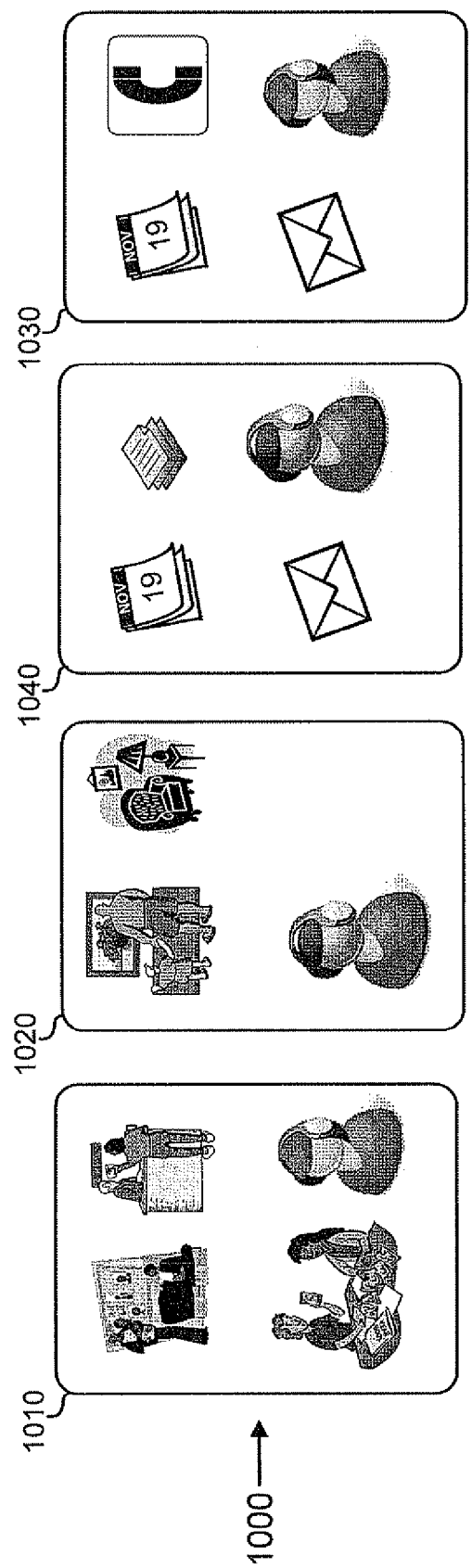

FIGS. 10A and 10B are diagrams illustrating insertion of a new panel into an existing sequence of panels. In FIG. 10A, assume that a sequence of panels 1000 includes panels 1010, 1020, and 1030. As illustrated, panel 1010 includes four items, each of which may be a thumbnail representation of an image. Selecting an image may cause device 200 to initiate an image viewing program through which the selected image may be presented on display 120 of device 200. Panel 1020 may include three image thumbnail items. Panel 1030 may include four items, including three application shortcut icons 1032 and an image thumbnail 1034. Selecting an application shortcut icon 1032 may cause device 200 to initiate the application corresponding to the selected icon (e.g., an email, calendar, or communication application).

As further illustrated in FIG. 10A, assume that a user adds a new panel 1040 to sequence of panels 1010. New panel 1040 may include three application shortcuts and an image thumbnail. Device 200 may determine the similarity of panel 1040 to the panels in sequence of panels 1000 (block 920, FIG. 9). In this example, because both panels 1030 and 1040 include three application shortcuts and an image thumbnail, assume that panel 1040 is determined to be most similar to panel 1030. Panel 1040 may be determined to be slightly similar to panels 1010 and 1020, as panel 1040 includes an image thumbnail and panels 1010 and 1040 include image thumbnails. Device 200 may thus determine that new panel 1040 is to be inserted between panels 1020 and 1030.

FIG. 10B illustrates sequence of panels 1000 after insertion of panel 1040 between panels 1020 and 1030. Sequence of panels 1000 now includes four panels.

Referring back to FIG. 9, in some situations, the new panel may not be similar or similar enough to any of existing panels 110. In this case, the new panel may be inserted at a default location (block 940), such as at the end of sequence of panels 1000. In an alternate possible implementation, the user may indicate the location for the new panel in sequence of panels 1000.

In some implementations, stage-based user interface 100 may periodically, at certain times, or in response to a user command, re-order the sequence of panels based on similarity.

Figure 11:
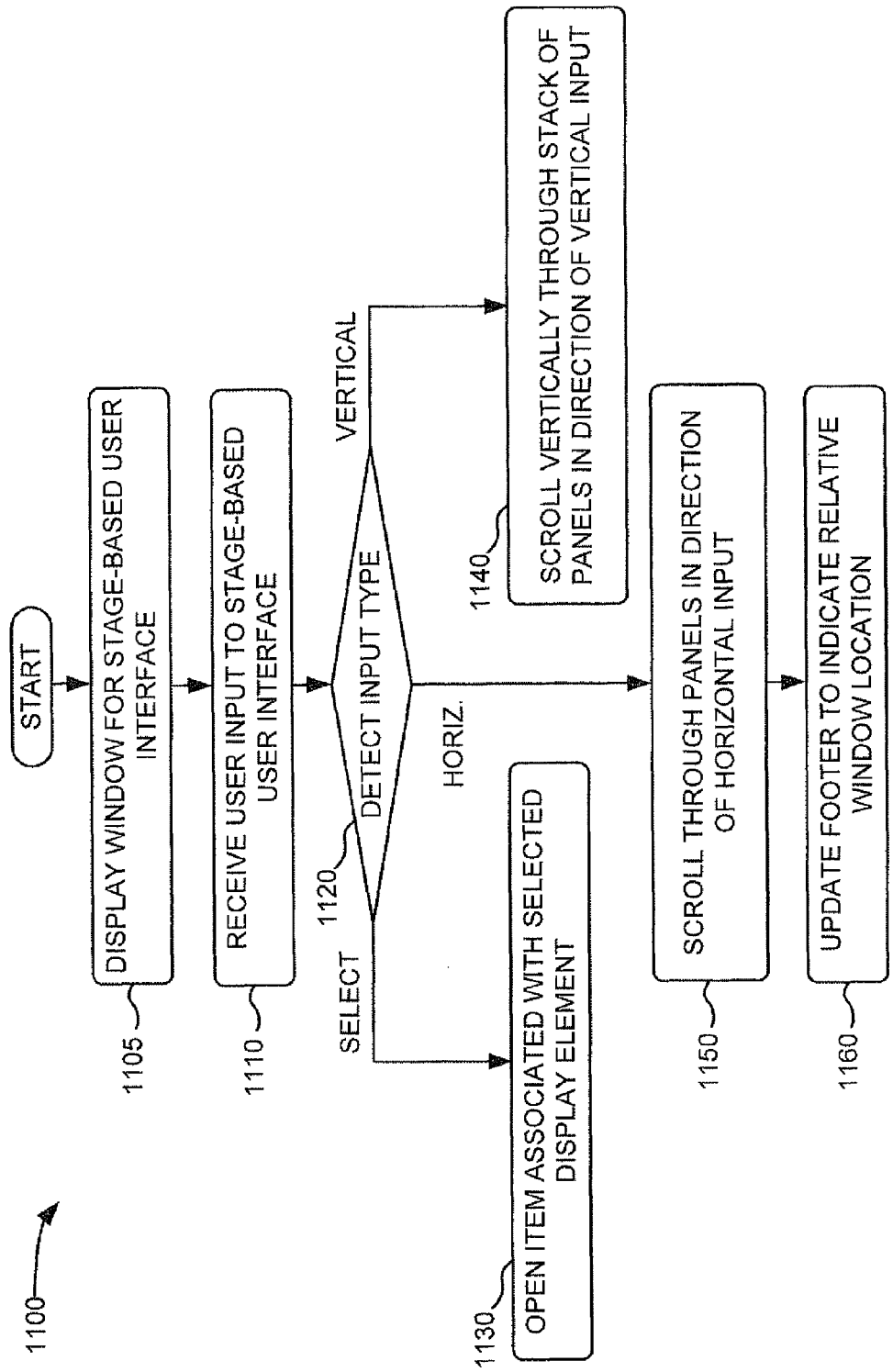
FIG. 11 depicts a flow chart of an exemplary process for providing the stage-based user interface according to implementations described herein.

FIG. 11 depicts a flow chart of an exemplary process 1100 for providing a stage-based user interface according to implementations described herein. In one implementation, the process depicted in FIG. 11 may be performed by device 200. The process may begin by displaying a window for a stage-based user interface (block 1105) and receiving user input to the stage-based user interface (block 1110). For example, device 200 may display a panel (e.g., panel 110) from a sequence of panels for the stage-based user interface (e.g., stage-based user interface 100). Device 200 may receive user input to the displayed window from a user in a variety of forms. In one implementation, the user input may be in the form of a touch gesture (such as a tap to select an icon, a horizontal slide, or a vertical slide) on a touch-sensitive display (e.g., display 230). In another implementation, the user input may be in the form of a control button (e.g., control button 240), such as a dedicated button to indicate a selection or a directional indicator (such as a joystick or trackball) to indicate a vertical or horizontal scroll. In a further implementation, the user input may be in the form of a keypad or keyboard input, such as a "Tab" or "Enter" key to indicate a selection, or an arrow key to indicate a vertical or horizontal direction input. In other implementations, different forms of user input or a combination of forms of user input may be used.

The type of input may be determined (block 1120). For example, device 200 may determine if the user input is one of a horizontal direction input, a vertical direction input, or a selection input. If the type of input is a selection input (block 1120—SELECT), an item associated with the selected display element (e.g., item) may be opened (or executed) (block 1130). For example, device 200 may open an item, such as a file, application or other object associated with one of display items 130.

If the type of input is a vertical direction input (block 1120—VERTICAL), a stack within a panel may be scrolled vertically in the direction of the vertical input (block 1140). For example, device 200 may scroll up or down a stack (e.g., stack 135) within a currently selected window. The stacks may include, for example, a list of display items (e.g., items 130).

If the type of input is a horizontal direction input (block 1120—HORIZ.), windows may be scrolled through panels in the direction of the horizontal input (block 1150) and a footer may be updated to indicate the relative panel location (block 1160). For example, device 200 may remove the current panel (e.g., panel 120) and display the next stage in the sequence of the stage-based user interface 100. Device 200 may also modify the presentation of a footer (e.g., footer 140) to indicate the position of the new panel in the sequence of the stage-based user interface 100.

Figure 12:
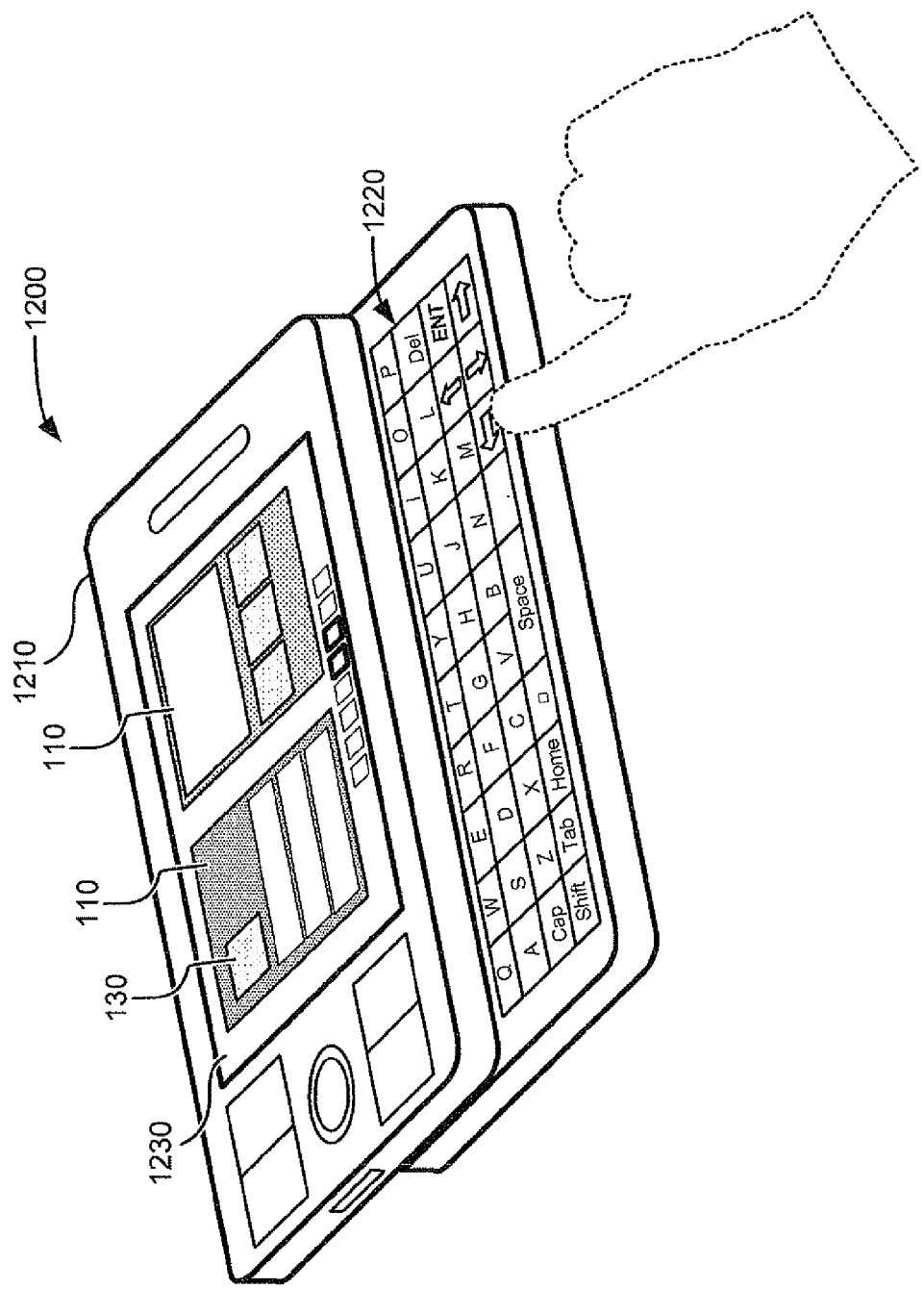
FIG. 12 provides an illustration of an exemplary implementation of a control-button interface on a mobile device.
Figure 13:
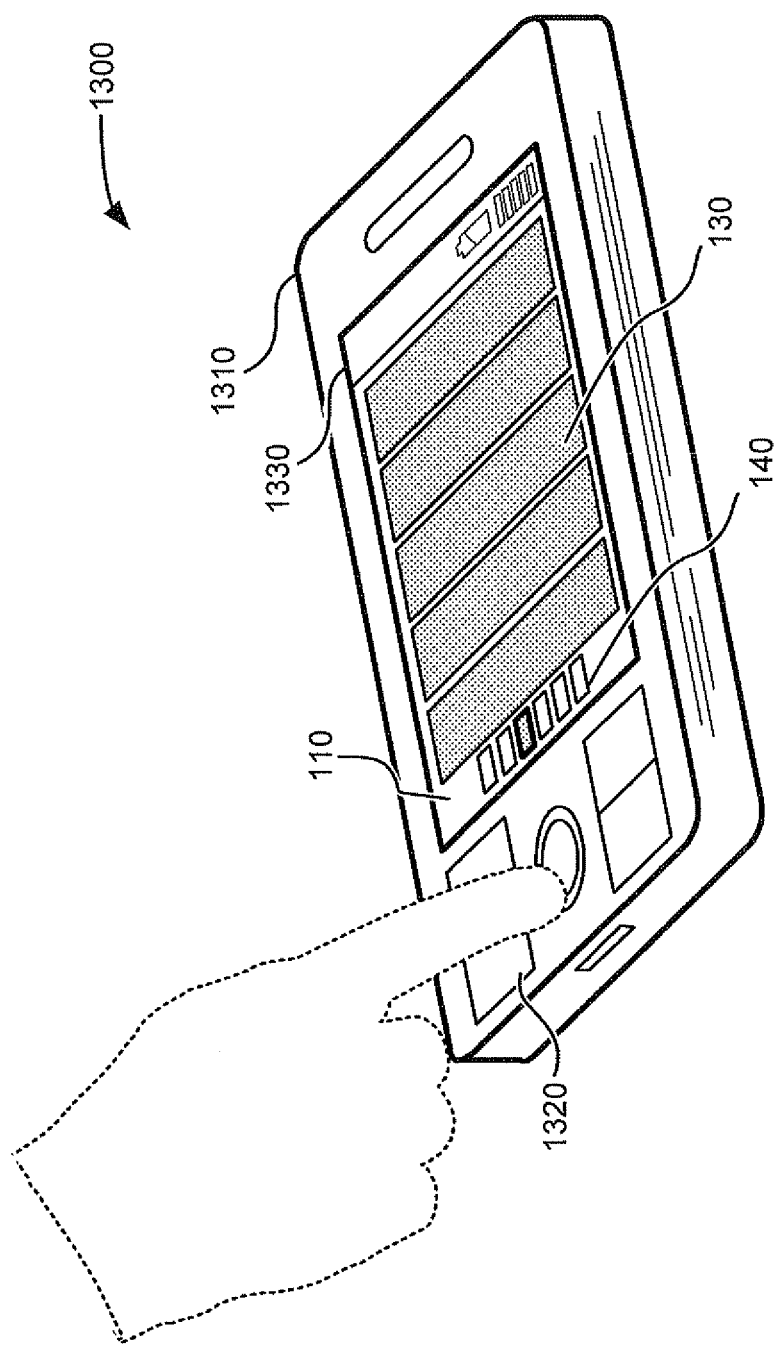
FIG. 13 provides an illustration of an exemplary implementation of a touch-pad interface on a mobile device.
Figure 14:
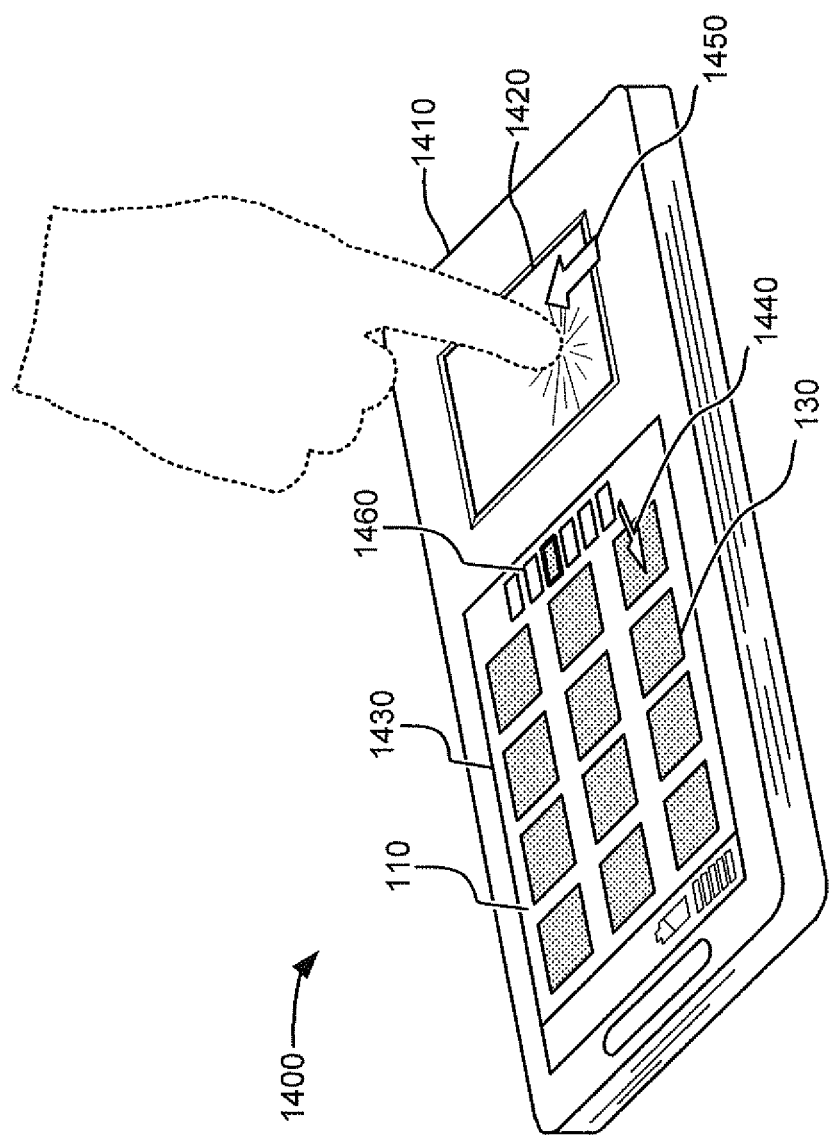
FIG. 14 provides an illustration of an exemplary implementation of a key-pad interface and a dual window display on a mobile device.

FIGS. 12-14 provide illustrations of exemplary user input for a stage-based user interface on a variety of devices. FIG. 12 provides an illustration of an exemplary implementation of user input for a stage-based user interface on a device 1200 with a QWERTY-like keypad. Device 1200 may include a housing 1210, a keypad 1220, and a display 1230. Other components, such as control buttons, a microphone, a camera, connectivity ports, memory slots, and/or speakers, may be located on device 1200, including, for example, on a rear, sliding, or side panel of housing 1210. Although FIG. 12 shows exemplary components of device 1200, in other implementations, device 1200 may contain fewer, different, differently arranged, or additional components than depicted in FIG. 12.

User input on keypad 1220 may be associated with display 1230 by, for example, toggling between defined user input locations within a window (using, e.g., a "Tab" key or a letter key associated with an item 130 within a stage 110). For example, in one implementation, a user may toggle between items 130 within panel 110 by using, for example, vertical arrow keys and/or "Tab" keys of keypad 1220. An item 130 may be selected by pressing, for example, an "Enter" key of keypad 1220 after highlighting item 130 using the arrow keys and/or "Tab" keys. Panels within stage-based user interface 100 may be changed, for example, by using horizontal arrows on keypad 1220.

FIG. 13 provides an illustration of an exemplary implementation of user input for a stage-based user interface on a device 1300 that may include a housing 1310, control buttons 1320, and a display 1330. Other components, such as a keypad, a microphone, a camera, connectivity ports, memory slots, and/or speakers, may be located on device 1300, including, for example, on a rear, sliding, or side panel of housing 1310. Although FIG. 13 shows exemplary components of device 1300, in other implementations, device 1300 may contain fewer, different, differently arranged, or additional components than depicted in FIG. 13.

User input via control buttons 1320 may be associated with display 1330 by, for example, toggling between defined user input locations within a window. For example, in one implementation, control buttons 1320 may include a dedicated control button to activate stage-based user interface 100. Once activated, a user may toggle vertically between items 130 within panel 110 by using, for example, a joystick, trackball, or direction pad associated with control buttons 1320. An item 130 may be selected by pressing, for example, another one of control buttons 1320 after highlighting item 130 using the joystick, trackball, or direction pad. Panels 110 within stage-based user interface may be changed, for example, by using horizontal direction indications on control buttons 1320.

FIG. 14 provides an illustration of an exemplary implementation of user input for a stage-based user interface on a device 1400 that may include a housing 1410, a touch panel 1220, and a display 1430. Other components, such as control buttons, a keypad, a microphone, a camera, connectivity ports, memory slots, and/or speakers, may be located on device 1400, including, for example, on a rear or side panel of housing 1410. Although FIG. 14 shows exemplary components of device 1400, in other implementations, device 1400 may contain fewer, different, differently arranged, or additional components than depicted in FIG. 14.

FIG. 14 illustrates touch panel 1420 being separately located from display 1430 on housing 1410. Touch panel 1420 may include any resistive touch panel technology or other technology that provides the ability to register a set of touch coordinates. User input on touch panel 1420 may be associated with display 1430 by, for example, movement and location of a cursor 1440. User input on touch panel 1420 may be in the form of the touch of nearly any object, such as a body part (e.g., a finger, as shown) or a pointing device (e.g., a stylus, pen, etc.).

Touch panel 1420 may be operatively connected with display 1430 to allow the combination of touch panel 1420 and display 1430 to be used as an input device. Touch panel 1420 may identify movement of an object as it moves on the surface of touch panel 1420. As described above, display 1430 may present a stage-based user interface that accepts (via touch panel 1420) user input to panel 110. In the example of FIG. 14, the touch on touch panel 1420 may be a sliding touch in a direction 1450 indicated. Device 1400 may detect the sliding touch on touch panel 1420 as a horizontal direction input and may replace the current panel with the next panel in the panel sequence of the stage-based user interface. Device 1400 may also update footer 1460 to indicate the position of the newly displayed stage within the panel sequence of the stage-based user interface.

Systems and/or methods described herein may display, on a stage area of a computer display, a graphical panel from a sequence of panels. The panel may include a group of display items. User input to the displayed panel may be received and the type of user input identified. The type of the user input may include a horizontal input, a vertical input, or a selection input. If the type of user input is a horizontal input, the device may display on the panel another graphical window from the sequence of panels. If the type of user input is a vertical input, the device may scroll through a stack of the display elements within the graphical window. If the type of user input is a selection input, the device may associate the location of the selection input with a particular display element of the group of display elements and launch an application associated with the particular display element. The sequence of the panels in the sequence of panels may be ordered based on similarity or likeness of the panels.

The foregoing description of implementations provides illustration and description, but is not intended to be exhaustive or to limit the invention to the precise form disclosed. Modifications and variations are possible in light of the above teachings or may be acquired from practice of the invention.

For example, while implementations herein have been described primarily in the context of a mobile device (such as a radiotelephone, a PCS terminal, or a PDA), in other implementations the systems and/or methods described herein may be implemented on other computing devices such as a laptop computer, a personal computer, a tablet computer, an ultra-mobile personal computer, or a home gaming system.

Also, while series of blocks have been described with regard to FIGS. 8, 9, and 11, the order of the blocks may be modified in other implementations. Further, non-dependent blocks may be performed in parallel.

It will be apparent that aspects described herein may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware may be designed to implement these aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    displaying, on a screen of a computing device, a graphical window that presents a panel from a sequence of panels,
        each of the panels in the sequence of panels including a group of items, and
        the sequence of panels including an order determined at least partially by the groups of items included in the panels;
    receiving, by the computing device, a command to add a new panel to the sequence of panels;
    determining, by the computing device, a similarity of the new panel to each of the panels in the sequence of panels based on:
        determining a first quantity of items included in the new panel,
        determining a particular quantity of items of the group of items included in each of the panels in the sequence of panels,
        comparing the first quantity of items to the particular quantity of items included in each of the panels in the sequence of panels, and
        determining, based on the comparison, a particular panel, of the panels in the sequence of panel, that is most similar to the new panel; and
    inserting, by the computing device and based on the determined similarity, the new panel next to the particular panel in the sequence of panels.

2. The method of claim 1, where the similarity is further determined based on a comparison of a type of items within the group of items associated with the panels.

3. The method of claim 1, where the similarity is further determined based on a comparison of a number or portion of identical items within the group of items associated with the panels.

4. The method of claim 1, where the order of the sequence of panels is determined based on a similarity of the groups of items corresponding to the panels in the sequence of panels.

5. The method of claim 1, where the items in the group of items include graphical icons that represent one or more of application shortcuts, documents, or multimedia files.

6. The method of claim 1, further comprising:
    receiving a user input;
    associating a location of the user input with a particular item of the group of items based on the user input; and
    launching an application associated with the particular item based on associating the location of the user input with the particular item.

7. The method of claim 1, further comprising:
    displaying, on the screen of the computing device, a footer to indicate a position of the inserted new panel with respect to each of the panels in the sequence of panels.

8. The method of claim 1, further comprising:
    receiving a user input;
    identifying a type of the user input; and
    displaying, on the screen, a next graphical window that presents a next panel from the sequence of panels based on the type of the user input.

9. The method of claim 6, where the user input includes:
    a touch on a touch-sensitive display.

10. A device comprising:
    a touch-sensitive display;
    a memory to store a plurality of instructions; and
    a processor to execute the plurality of instructions in the memory to:
        display, on the touch-sensitive display, a graphical window that presents a panel from a sequence of panels,
            each of the panels in the sequence of panels including a group of items, and
            the sequence of panels including an order determined at least partially by groups of items included in the panels;
        receive a command to add a new panel to the sequence of panels;
        determine a similarity of the new panel to each of the panels in the sequence of panels, when determining the similarity of the new panel to each of the panels in the sequence of panels, the processor being further to:
            determine a first quantity of items included in the new panel,
            determine a particular quantity of items of the group of items included in each of the panels in the sequence of panels,
            compare the first quantity of items to the particular quantity of items included in each of the panels in the sequence of panels, and
            determine, based on the comparison, a particular panel, of the panels in the sequence of panel, that is most similar to the new panel; and insert, based on the determined similarity, the new panel next to the particular panel in the sequence of panels.

11. The device of claim 10, where the processor is further to:
   determine the similarity further based on a comparison of a type of items within the group of items associated with the panels.

12. The device of claim 10, where the processor is further to:
   determine the similarity further based on a comparison of a number or portion of identical items within the group of items associated with the panels.

13. The device of claim 10, where the order of the sequence of panels is determined based on a similarity of the items in the panels.

14. The device of claim 10, where the items in a panel include graphical icons that represent one or more of application shortcuts, documents, or multimedia files.

15. The device of claim 10, where the processor is further to:
   display, on the touch-sensitive display, a footer to indicate a position of the inserted new panel with respect to each of the panels in the sequence of panels.

16. The device of claim 10, where the processor is further to execute the plurality of instructions in the memory to:
   receive a user input;
   identify a type of the user input; and
   display, on the touch-sensitive display, a next graphical window that presents a next panel from the sequence of panels based on the type of the user input.

17. A non-transitory computer-readable medium storing instructions, the instructions comprising:
   one or more instructions which, when executed by a processor, cause the processor to:
      display, on a screen of a device, a graphical window that presents a panel from a sequence of panels,
         each of the panels in the sequence of panels including a group of items, and
         the sequence of panels including an order determined at least partially based on the groups of items included in the panels;
      receive a command to add a new panel to the sequence of panels;
      determine a similarity of the new panel to each of the panels in the sequence of panels, the one or more instructions to determine the similarity of the new panel to each of the panels in the sequence of panels including:
         one or more instructions to determine a first quantity of items included in the new panel,
         one or more instructions to determine a particular quantity of items of the group of items included in each of the panels in the sequence of panels,
         one or more instructions to compare the first quantity of items to the particular quantity of items included in each of the panels in the sequence of panels, and
         one or more instructions to determine, based on the comparison, a particular panel, of the panels in the sequence of panel, that is most similar to the new panel; and
      insert, based on the determined similarity, the new panel next to the particular panel in the sequence of panels.

18. The medium of claim 17, where the instructions further comprise:
   one or more instructions to receive a user input;
   one or more instructions to identify a type of the user input; and
   one or more instructions to display, on the screen, a next graphical window that presents a next panel from the sequence of panels based on the type of the user input.

19. The medium of claim 17, where the one or more instructions to determine the similarity of the new panel to each of the panels in the sequence of panels include:
   one or more instructions to determine the similarity further based on a comparison of a type of items within the group of items associated with the panels.

20. The medium of claim 17, where the one or more instructions to determine the similarity of the new panel to each of the panels in the sequence of panels include:
   one or more instructions to determine the similarity further based on a similarity of the groups of items corresponding to the panels in the sequence of panels.

21. The medium of claim 17, where the instructions further comprise:
   one or more instructions to display a footer to indicate a position of the inserted new panel with respect to each of the panels in the sequence of panels.

22. The medium of claim 17, where the instructions further comprise:
   one or more instructions to determine the similarity further based on at least one of:
      a comparison of a type of items within the group of items associated with the panels; or
      a comparison of a number or portion of identical items within the group of items associated with the panels.

* * * * *